(12) United States Patent
Eschenmoser et al.

(10) Patent No.: US 11,215,297 B2
(45) Date of Patent: Jan. 4, 2022

(54) VACUUM VALVE HAVING TEMPERATURE SENSOR

(71) Applicant: VAT HOLDING AG, Haag (CH)

(72) Inventors: Adrian Eschenmoser, Grabs (CH); Andreas Hofer, Widnau (CH)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 16/627,246

(22) PCT Filed: Jun. 28, 2018

(86) PCT No.: PCT/EP2018/067462
§ 371 (c)(1),
(2) Date: Dec. 27, 2019

(87) PCT Pub. No.: WO2019/002487
PCT Pub. Date: Jan. 3, 2019

(65) Prior Publication Data
US 2020/0224790 A1    Jul. 16, 2020

(30) Foreign Application Priority Data
Jun. 30, 2017 (EP) .................................... 17179102

(51) Int. Cl.
*F16K 51/02*    (2006.01)
*F16K 3/18*     (2006.01)
(Continued)

(52) U.S. Cl.
CPC ............... *F16K 51/02* (2013.01); *F16K 3/04* (2013.01); *F16K 3/18* (2013.01); *F16K 37/0041* (2013.01);
(Continued)

(58) Field of Classification Search
CPC .. F16K 51/02; F16K 37/0041; F16K 37/0075; F16K 37/0083; F16K 3/10; F16K 3/04; F16K 3/18
See application file for complete search history.

(56) References Cited

U.S. PATENT DOCUMENTS 3,145,969 A    8/1964  Von
4,896,101 A *  1/1990  Cobb .................. F16K 37/0083
                                                          324/73.1
(Continued)

FOREIGN PATENT DOCUMENTS

CN        1445470 A      10/2003
CN      102937207 A       2/2013
(Continued)

OTHER PUBLICATIONS

International Search Report and Written Opinion dated Jun. 28, 2018 in International Application No. PCT/EP2018/067462.

*Primary Examiner* — David Colon-Morales
(74) *Attorney, Agent, or Firm* — Muncy, Geissler, Olds & Lowe, P.C.

(57) ABSTRACT

Disclosed is a vacuum valve having a valve seat, which has a valve opening, defining an opening axis, and a first sealing surface, a valve closure having a second sealing surface corresponding to the first sealing surface, a drive unit coupled to the valve closure, which can be moved from an open position, in which the valve closure and the valve seat do not contact each other, to a closed position, in which there is a sealing contact between the first sealing surface and the second sealing surface by a seal there between, and the valve opening is sealed gastight as a result. The vacuum valve has at least one temperature sensor, where the temperature sensor is designed and arranged such that, from the temperature sensor, a measurement signal representing thermal (Continued)

Figure 1A:
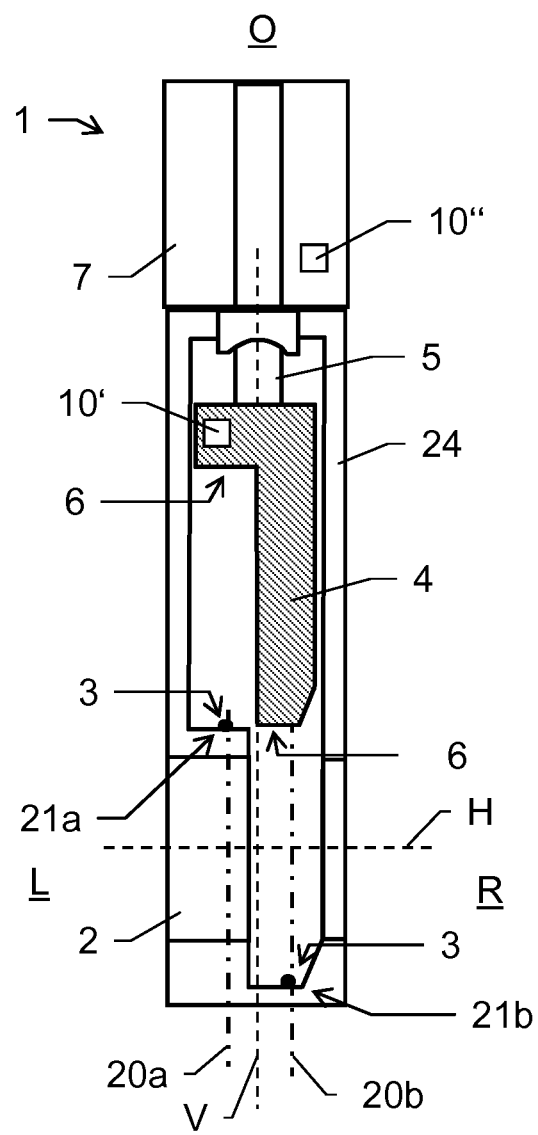

information in respect of at least one part of the vacuum valve can be detected.

14 Claims, 4 Drawing Sheets

(51) Int. Cl.
*F16K 37/00* (2006.01)
*F16K 3/04* (2006.01)
*F16K 3/02* (2006.01)
*F16K 3/10* (2006.01)
*F16K 3/314* (2006.01)

(52) U.S. Cl.
CPC .............. *F16K 3/0218* (2013.01); *F16K 3/10* (2013.01); *F16K 3/314* (2013.01); *F16K 37/0083* (2013.01)

(56) References Cited

U.S. PATENT DOCUMENTS

| | | | |
|---|---|---|---|
| 5,577,707 A | 11/1996 | Brida | |
| 6,056,266 A | 5/2000 | Blecha | |
| 6,089,537 A | 7/2000 | Olmsted | |
| 6,095,180 A | 8/2000 | Ishigaki | |
| 6,416,037 B1 | 7/2002 | Geiser | |
| 6,629,682 B2 | 10/2003 | Duelli | |
| 6,708,721 B2 * | 3/2004 | Fukuda | F16K 49/002 137/338 |
| 8,850,880 B2 * | 10/2014 | Puttmer | F16K 37/0083 73/168 |
| 9,010,361 B2 * | 4/2015 | Averbeck | F16K 37/0075 137/487.5 |
| 9,726,643 B2 * | 8/2017 | Comeaux | F16K 3/02 |
| 2003/0086470 A1 | 5/2003 | Nomiyama et al. | |
| 2005/0067603 A1 | 3/2005 | Lucas et al. | |
| 2009/0114861 A1 * | 5/2009 | Luebbers | F16K 37/0091 251/129.11 |
| 2010/0282710 A1 | 11/2010 | Kitamura | |

FOREIGN PATENT DOCUMENTS

| | | |
|---|---|---|
| CN | 103591365 A | 2/2014 |
| DE | 1264191 B1 | 3/1968 |
| DE | 77 31 993 U | 1/1978 |
| DE | 3447008 C2 | 6/1986 |
| DE | 3612069 A1 | 11/1986 |
| JP | S55 86175 U | 6/1980 |
| JP | 2003139561 A | 5/2003 |
| JP | 2010 112388 A | 5/2010 |

* cited by examiner

VACUUM VALVE HAVING TEMPERATURE SENSOR

This application is a 371 National Phase of PCT Application No. PCT/EP2018/067462, filed on Jun. 28, 2018; which claims priority to European Patent application 17179102.3 filed Jun. 30, 2017 and each of which is herein incorporated by reference in its entirety.

The invention relates to a vacuum valve having a sensor arrangement with at least one temperature sensor having a deformation-sensitive element.

Vacuum valves for regulating a volume or mass flow and/or for essentially gas-tight closing of a flow path leading through an opening formed in a valve housing are generally known from the prior art in various embodiments and are used in particular in vacuum chamber systems in the area of IC, semiconductor or substrate production, which must take place in a protected atmosphere as far as possible without the presence of contaminating particles. Such vacuum chamber systems comprise in particular at least one evacuatable vacuum chamber which is provided for receiving semiconductor elements or substrates to be processed or produced and which has at least one vacuum chamber opening through which the semiconductor elements or other substrates can be guided into and out of the vacuum chamber, and at least one vacuum pump for evacuating the vacuum chamber. For example, in a production plant for semiconductor wafers or liquid crystal substrates, the highly sensitive semiconductor or liquid crystal elements pass sequentially through several process vacuum chambers in which the parts located within the process vacuum chambers are each processed by means of a processing device. Both during the machining process within the process vacuum chambers and during the transport from chamber to chamber, the highly sensitive semiconductor elements or substrates must always be in a protected atmosphere—especially in an airless environment.

For this purpose, peripheral valves are used to open and close a gas inlet or outlet and transfer valves are used to open and close the transfer openings of the vacuum chambers for inserting and removing the parts.

The vacuum valves through which semiconductor parts pass are referred to as vacuum transfer valves due to the area of application described and the associated dimensioning, as rectangular valves due to their mainly rectangular opening cross-section and also as slide valves, rectangular sliders or transfer slide valves due to their normal mode of operation.

Peripheral valves are used in particular to control or regulate the gas flow between a vacuum chamber and a vacuum pump or another vacuum chamber. For example, peripheral valves are located within a pipe system between a process vacuum chamber or a transfer chamber and a vacuum pump, the atmosphere or another process vacuum chamber. The opening cross-section of such valves, also known as pump valves, is generally smaller than that of a vacuum transfer valve. Peripheral valves are also called regulating valves because, depending on the application, they are not only used to completely open and close an opening, but also to control or regulate a flow by continuously adjusting the opening cross-section between a complete open position and a gas-tight closed position. A possible peripheral valve for controlling or regulating the gas flow is the pendulum valve.

In a typical pendulum valve, as known for example from U.S. Pat. No. 6,089,537 (Olmsted), the first step is to rotate a normally round valve disk from a position that releases the opening to an intermediate position that covers the opening via an opening that is usually also round. In the case of a slide valve, as described for example in U.S. Pat. No. 6,416,037 (Geiser) or U.S. Pat. No. 6,056,266 (Blecha), the valve disk, as well as the opening, is usually shaped rectangular and in this first step is pushed linearly from a position releasing the opening into an intermediate position covering the opening. In this intermediate position, the valve disk of the pendulum or slide valve is located at a distance from the valve seat surrounding the opening. In a second step, the distance between the valve disk and the valve seat is reduced so that the valve disk and the valve seat are pressed evenly against each other and the opening is closed essentially gas-tight. This second movement preferably occurs in a direction substantially perpendicular to the valve seat. The sealing can, for example, take place either via a sealing ring arranged on the closing side of the valve disk, which is pressed onto the valve seat surrounding the opening, or via a sealing ring on the valve seat, against which the closing side of the valve disk is pressed. Due to the two-step closing process, the sealing ring between the valve disk and the valve seat is subjected to hardly any shear forces that would destroy the sealing ring, as the movement of the valve disk in the second step takes place essentially in a straight line perpendicular to the valve seat.

Various prior art sealing devices are known, for example from U.S. Pat. No. 6,629,682 B2 (Duelli). A suitable material for sealing rings and seals in vacuum valves is, for example, fluororubber, also known as FKM, in particular the fluoroelastomer known under the trade name "Viton", and perfluororubber, FFKM for short.

From the prior art, different drive systems are known to achieve this combination of a rotational and a translational movement of the valve disk parallel to the opening of the pendulum valve and a substantially translational movement perpendicular to the opening of the slide valve, for example from U.S. Pat. No. 6,089,537 (Olmsted) for a pendulum valve and from U.S. Pat. No. 6,416,037 (Geiser) for a slide valve.

The valve disk must be pressed against the valve seat in such a way that both the required gas tightness within the entire pressure range is ensured and damage to the sealing medium, in particular the sealing ring in the form of an O-ring, caused by excessive pressure loading is avoided. In order to guarantee this, well-known valves provide for pressure regulation of the valve disk which is regulated depending on the pressure difference prevailing between the two valve disk sides. Especially with large pressure fluctuations or the change from vacuum to overpressure, or vice versa, an even force distribution along the entire circumference of the sealing ring cannot always be guaranteed. In general, the aim is to decouple the sealing ring from support forces resulting from the pressure applied to the valve. In U.S. Pat. No. 6,629,682 (Duelli), for example, a vacuum valve with a sealing medium is proposed, which consists of a sealing ring and an adjacent support ring, so that the sealing ring is essentially free of support forces.

In order to achieve the required gas tightness, possibly for both positive and negative pressure, some well-known pendulum valves or slide valves additionally or alternatively to the second movement step provide a valve ring which can be displaced perpendicularly to the valve disk, surrounds the opening and is pressed onto the valve disk to close the valve in a gas-tight manner. Such valves with valve rings that can be actively displaced relative to the valve disk are known, for example, from DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve housing having an opening and a valve disk that swivels parallel across the opening to control flow through the opening. A valve ring, which surrounds the opening, can be actively moved vertically in the direction of the valve disk by means of several springs and compressed air cylinders. A possible further development of this pendulum valve is proposed in US 2005/0067603 A1 (Lucas et al.).

Since the valves mentioned above are used, among other things, in the production of highly sensitive semiconductor elements in a vacuum chamber, a corresponding sealing effect must also be reliably guaranteed for such process chambers. For this purpose, the condition of the entire valve or in particular of a sealing material or a sealing surface in contact with the sealing material during compression is of particular importance. During the service life of a vacuum valve, changes in valve components can typically occur due to wear of the sealing material or the sealing surfaces as well as structural changes of the valve components, e.g. drive unit or valve stem, due to environmental influences (temperature, humidity, shocks, etc.).

In order to avoid possible leakage or to maintain the quality of the seal at a constant sufficiently high level, a valve closure can typically be replaced at certain intervals. Such a maintenance cycle is usually measured by the number of opening and closing cycles to be expected within a certain period or by the number and severity of environmental influences. Maintenance is typically carried out as a precaution in order to be able to exclude the occurrence of a leak as far as possible in advance.

Such a maintenance requirement is not limited to the sealing material or the valve disk alone, but extends in particular to other valve components such as the drive unit or the valve seat, which forms a part of the vacuum valve corresponding to the valve disk. The structure of a sealing surface on the side of the valve seat, e.g. a groove embedded in the valve seat, is also affected by mechanical stress. Therefore, a structural change in the groove or valve seat resulting from valve operation may also affect the seal. This, too, is usually done at appropriate maintenance intervals.

A disadvantage of this valve maintenance is its precautionary character. Parts affected by maintenance are usually renewed or replaced before their regular or actual life expires. Each such maintenance step usually means a certain downtime for a production process and an increased technical and financial effort. In sum, this means a standstill in production at intervals that are shorter than necessary and more frequent than would be necessary at all.

In addition, parts of the valve, e.g. the drive unit, are typically not replaced or renewed as part of regular and precautionary maintenance. However, even if such a component were to be replaced regularly, it would remain exposed to any external and internal influences even in a quasi-new condition, which could result in undesirable changes to the valve, for example, at least temporarily. For example, a deviation of an adjustment travel for the valve closure caused by this can lead to the consequence that a target sealing effect cannot be achieved any longer.

The invention is therefore based on the object of providing an improved vacuum valve, which allows an optimized operation of the vacuum valve.

It is a further object of the invention to provide an improved vacuum valve, which allows optimized valve maintenance and thus an improvement, i.e. a shortening of possible process stoppages.

A further object of the invention is to provide such a valve system, with which a more reliable gas-tight sealing of a process volume can be achieved, in particular wherein the quality of the sealing is predictable.

These objects are solved by the realization of the characterizing features of the independent claims. Features which further develop the invention in an alternative or advantageous way can be found in the dependent patent claims.

The basic idea of the present invention is to combine a vacuum valve with a sensor arrangement with at least one temperature sensor and to design the valve and the sensor arrangement in such a way that a detection and/or monitoring of thermal influences or events at a certain part of the valve or at the valve as a whole can take place.

For example, the temperature can be measured on a drive housing in the area of temperature-critical components, such as a pneumatic cylinder or sensors. An alternative measuring point is directly on the vacuum housing. The temperature that can be measured in this way can be used to record the status of the valve. For example, an increased temperature may be an indicator of a related change in valve activity. This may result in increased play of the drive unit. By knowing the temperature effect and simultaneously measuring the temperature, the functional safety of the valve can always be monitored and adjusted.

Based on the information collected in this way, a valve actuation can be adapted. If, for example, a high temperature is measured and it is also known how this temperature influences the behavior of the valve, an adjustment of the drive unit control can compensate for a possible negative effect. If, for example, a changed bending behavior of the drive unit or a valve stem is to be expected, a higher contact pressure (on the seal) can be set.

Other parameters and measurement data that influence the behavior of the valve can also be taken into account when adapting the controller.

In general, the temperature sensor allows information to be generated as to whether a measured temperature is within a target range or whether the temperature exceeds a defined threshold value. For this purpose, the valve or its processing and control unit has correspondingly stored target data for alignment with current measured values.

By monitoring and, optionally, recording the temperature at the valve over a certain period of time, in particular continuously from commissioning, information can be generated with reference to a temperature-dependent service life of the valve. For example, a temperature- and time-induced change of a sealing material can be detected and the necessity of a replacement of the sealing material can be indicated. The operation of the valve outside an ideal temperature range and the duration of this operation can also be recorded and evaluated with regard to an effect on the life expectancy of certain valve components.

A PT100 element, for example, can be used as a temperature sensor. At 0° C. this has an electrical resistance of 100 ohm. At higher temperatures, this resistance increases in a known way. The resistance can be measured and evaluated accordingly, allowing an absolute temperature to be determined. An element can be used which can be mounted directly on a metallic surface of the valve so that the surface temperature of at least this part can be measured.

Alternative state-of-the-art temperature sensors are also conceivable. For example, an optical sensor that provides measurement data using infrared radiation can be used.

By monitoring the valve temperature, maintenance intervals can be better planned and carried out more efficiently, while at the same time maintaining and safeguarding process integrity.

The invention relates to a vacuum valve, in particular a vacuum slide valve, a pendulum valve or a monovalve, for regulating a volume or mass flow and/or for gas-tight interruption of a flow path. The valve has a valve seat which has a valve opening defining an opening axis and a first sealing surface surrounding the valve opening, a valve closure, in particular a valve disk, for regulating the volume or mass flow and/or for interrupting the flow path, with a second sealing surface corresponding to the first sealing surface, and a drive unit coupled to the valve closure.

The output unit is designed such that the valve closure is adjustable from an open position, in which the valve closure and the valve seat are contactless relative to one another, to a closed position, in which there is sealing contact between the first sealing surface and the second sealing surface via an interposed seal and the valve opening is thereby closed in a gas-tight manner, and back again.

The drive unit can be designed as an electric motor, e.g. stepper motor, or as a pneumatic drive.

The vacuum valve has at least one temperature sensor, wherein the temperature sensor is designed and arranged in such a way that a measurement signal representing thermal information relating to at least part of the vacuum valve can be detected by means of the temperature sensor.

The temperature sensor is thus able to provide a measurement signal which makes it possible to derive a thermal state of the valve or a component of the valve, wherein the signal can, for example, be processed directly in a processing and control unit or output as visual or acoustic information.

In one embodiment, the temperature sensor can, for example, be arranged on the drive unit.

The drive unit can in particular be designed as a pneumatic drive and the temperature sensor can be arranged on a pneumatic cylinder of the drive unit.

In such an arrangement, the temperature sensor can record the thermal information with direct reference to an operating state of the drive unit, i.e. the measurement signal of the temperature sensor provides direct information on a function of opening and closing the valve. For example, an increase in the operating temperature can lead to an increase in elasticity in the system, which can then be detected and compensated for.

According to a further embodiment, the temperature sensor can be arranged at the valve closure or the valve seat. This makes it possible, for example, to monitor the condition of the seal, e.g. of a polymer-based sealing material. At low temperatures the material can be considerably stiffer than at high temperatures and the drive can be adapted accordingly to the thermal material behavior, e.g. with regard to a target contact pressure.

The vacuum valve can have a valve housing in one embodiment and the temperature sensor can be arranged on the valve housing. With this embodiment the thermal information concerning the housing can be recorded. For example, external influences on the valve (e.g. changes in the ambient temperature) can be measured.

In one embodiment, the temperature sensor can be designed as a hot conductor or as a PTC thermistor, in particular as a platinum or silicon measuring resistor, in particular as a Pt 100 element. The temperature sensor can also be designed as a semiconductor temperature sensor, in particular an integrated semiconductor temperature sensor, as an optical temperature sensor, in particular an infrared thermometer, or as a thermocouple. In the context of this invention, these variants of temperature sensors should not be regarded as conclusive, but rather as alternative sensor types that can provide a thermal measurement signal.

The thermal information is represented in particular by a temperature, but can also be expressed, for example, in the form of thermal energy.

According to one embodiment, the measurement signal can be continuously recorded. For this purpose, the vacuum valve may have a processing and control unit configured accordingly with an algorithm. The continuous recording provides continuous monitoring and checking of the valve function as a function of a thermal condition.

In one embodiment, the drive unit of the vacuum valve can be actuated in a controlled manner by a processing and control unit of the vacuum valve with control values for adjusting the valve closure between the open position and the closed position. In particular, the processing and control unit is then set up in such a way that the control values are automatically set depending on the currently acquired measurement signal. Thus an automatic compensation of temperature-dependent (negative) effects can be provided.

According to one embodiment of the invention, the vacuum valve can have a processing and control unit designed in such a way that the detected measurement signal can be processed by means of the processing and control unit and status information is generated on the basis of the detected measurement signal. An output signal can be provided based on a comparison of the status information with a predefined tolerance value.

In particular, the status information relating to a mechanical and/or structural integrity of the drive unit, the valve seat and/or the valve closure can be provided, in particular wherein the status information is generated by means of an actual-target comparison for the detected measurement signal.

The invention also relates to a method for controlling a vacuum valve, in particular a vacuum slide valve, pendulum valve or monovalve, wherein the vacuum valve is designed to regulate a volume or mass flow and/or to interrupt a flow path in a gas-tight manner. The vacuum valve has a valve seat which has a valve opening defining an opening axis and a first sealing surface surrounding the valve opening, and a valve closure, in particular a valve disk, for regulating the volume or mass flow and/or for interrupting the flow path, with a second sealing surface corresponding to the first sealing surface, the variable position of which is determined by a respective position and orientation of the valve closure. A drive unit coupled to the valve closure and having at least one movable adjustment element is also provided, wherein the drive unit is designed to carry out an adjusting movement so that the valve closure can be adjusted from an open position, in which the valve closure and the valve seat are present without contact relative to one another, to a closed position, in which, in particular via a seal, there is sealing contact between the first sealing surface and the second sealing surface and the valve opening is thereby closed in a gas-tight manner, and back again.

During the process, in particular continuously, thermal information relating to at least part of the vacuum valve is recorded.

In one embodiment, the thermal information can be recorded periodically during a certain period of time, in particular continuously, and a temperature-time curve can be derived. This allows a change in the status of the valve over a certain period of time to be logged, analyzed and, for example, processed into an alarm signal or a maintenance request.

In other words, output information relating to a valve state can be generated on the basis of the temperature-time curve, in particular the output information indicating a reference of a current temperature to a temperature threshold value, in particular an exceeding of the temperature threshold value. The output information can also indicate an effect of the temperature-time curve on an operating condition of the valve, in particular on process reliability, valve service life and/or an expected valve maintenance time.

The invention also relates to a computer program product having program code which is stored on a machine-readable carrier, in particular a control and processing unit of a vacuum valve described above, or a computer data signal embodied by an electromagnetic wave, for carrying out the acquisition of the thermal information and/or in particular a process described above.

The vacuum valve according to the invention is described in more detail below by means of embodiment examples schematically shown in the drawings. The same elements are marked in the figures with the same reference numerals. As a rule, the embodiments described are not to scale and are not to be understood as limitations.

Figure 2C:
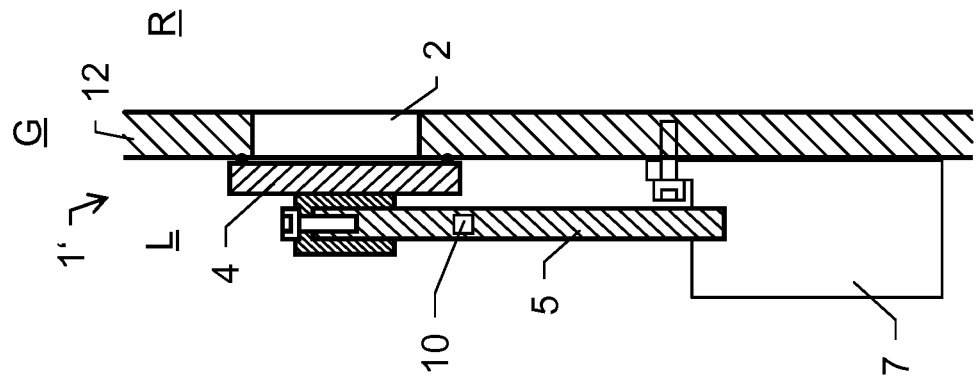
Figure 2B:
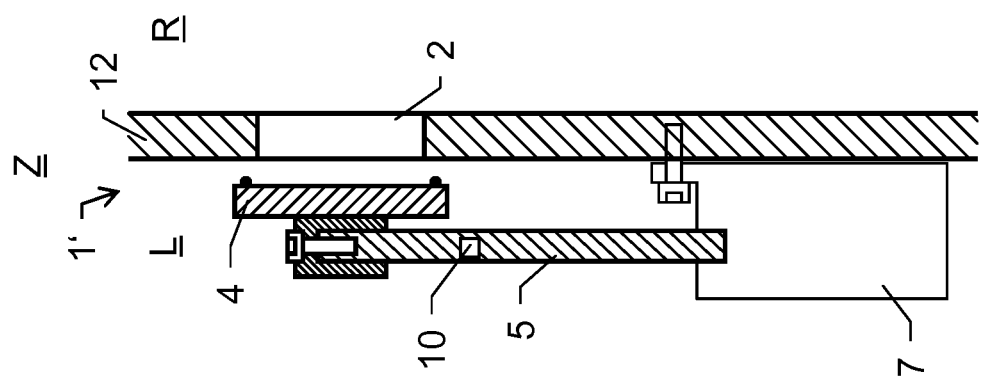
Figure 2A:
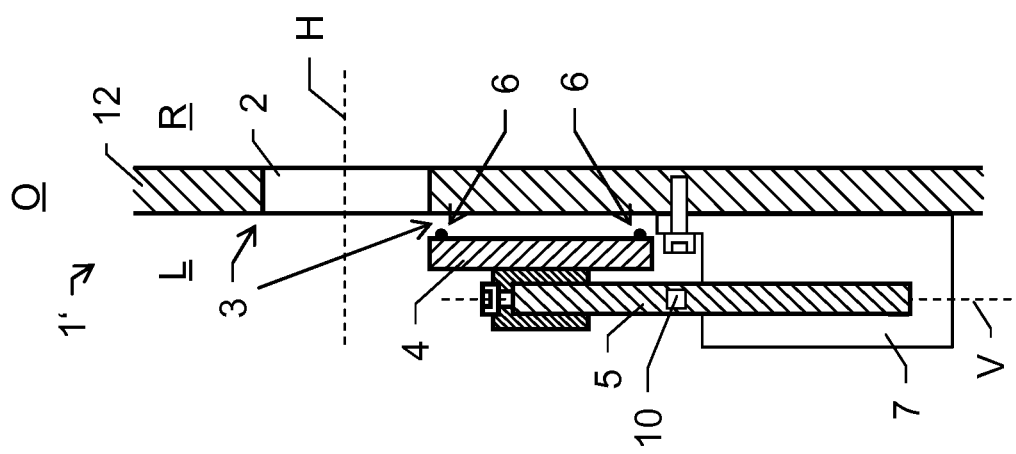
Figure 3A:
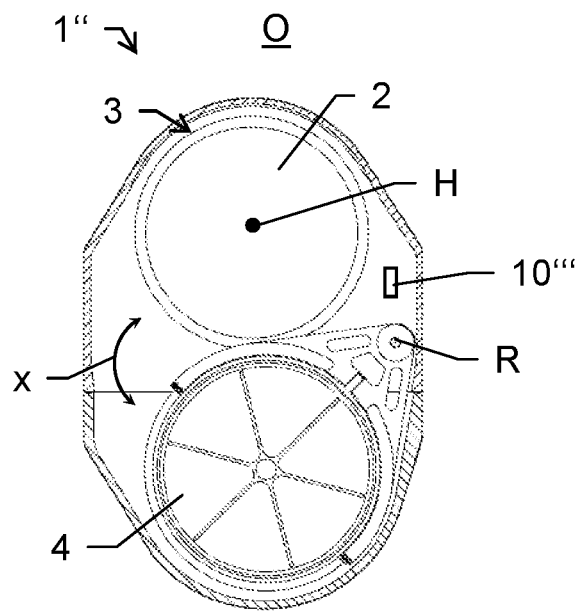
Figure 4A:
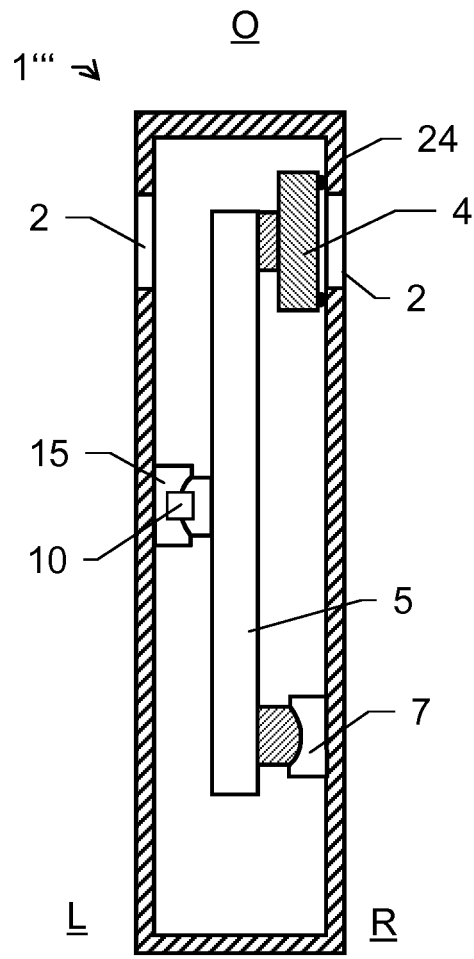

The figures show in detail:

FIGS. 1a,b show a possible first embodiment of a vacuum valve according to invention as a monovalve;

FIGS. 2a-c show a possible further embodiment of a vacuum valve according to the invention as a transfer valve;

FIGS. 3a,b show a schematic representation of another embodiment of a vacuum valve as a pendulum valve in accordance with the invention; and FIGS. 4a,b show a schematic representation of another embodiment of a vacuum valve as a transfer valve according to the invention.

Figure 1B:
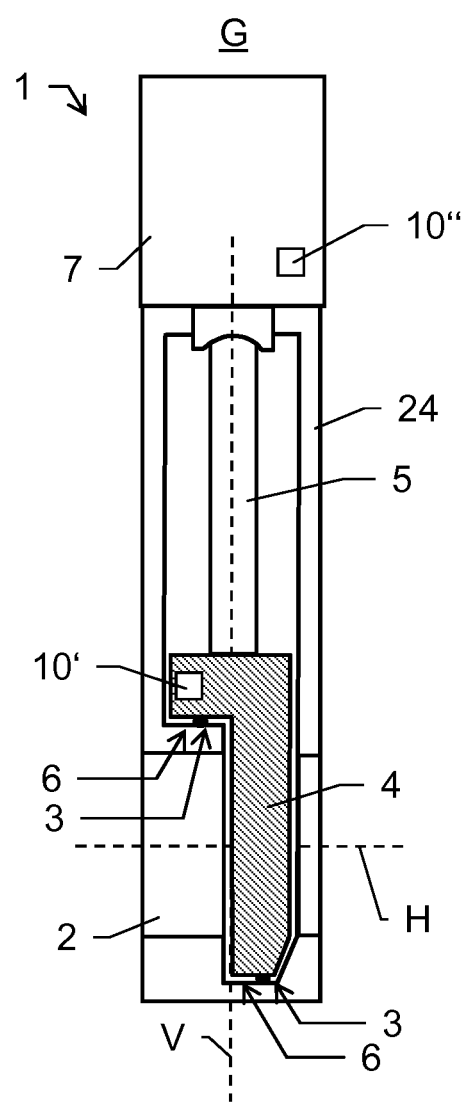

FIGS. 1a, 1b schematically show a first embodiment of a vacuum valve 1 according to the invention.

In the example, valve 1 is designed as a so-called monovalve and shown in cross-section in an open position O (FIG. 1a) and a closing position G (FIG. 1b).

Valve 1 for the gas-tight closing of a flow path by means of a linear movement has a valve housing 24 with an opening 2 for the flow path, wherein opening 2 has a geometric opening axis 5 along the flow path. The opening 2 connects a first gas area L, which is located in the drawing to the left of valve 1 or a partition wall (not shown), with a second gas area R to the right of it. Such a partition wall is formed, for example, by a chamber wall of a vacuum chamber.

The closure element 4 can be displaced linearly along a geometrical adjustment axis V extending transversely to the opening axis H in a closure element plane 22 from an open position O releasing the opening 2 into a closed position G linearly pushed over the opening 2 in a closing direction and vice versa back into an opening direction by means of a drive unit 7 with a movable actuating element 5, in the example an adjustment arm.

For example, a (curved) first sealing surface 3 encloses the opening 2 of the valve body 24 along a first section 21a in a first plane 20a and along a second section 21b in a second plane 20b. The first plane 20a and the second plane 20b are spaced apart, parallel to each other and parallel to the closure element plane 22. Thus the first section 21a and the opposite second section 21b have a geometric offset to each other transversely to the adjustment axis V and in the direction of the opening axis H. The first section 21a and the opposite second section 21b have a geometric offset to each other transversely to the adjustment axis V and in the direction of the opening axis H. The opening 2 is arranged between the two opposing sections 21a and 21b in the area extending along the adjustment axis V.

The closure element 4 has a second sealing surface 6 corresponding to the first sealing surface 3, which runs along sections corresponding to the first and second sections 21a, 21b.

In the example shown, a sealing material forming a seal is provided on the first sealing surface 3 of the valve seat. Alternatively or additionally, the seal can be arranged on the second sealing surface 6 of the valve closure.

The seal can, for example, be vulcanized onto the valve seat as a polymer by means of vulcanization. Alternatively, the seal can be designed as an O-ring in a groove of the valve seat, for example. A sealing material can also be bonded to the valve seat and thus embody the seal. Such seals are of course not limited to the valve 1 described in the example, but can also be used with the other described valve embodiments.

Monovalves, i.e. vacuum valves that can be closed by a single linear movement, have the advantage of a relatively simple closing mechanism, e.g. compared to transfer valves that can be closed by two movements and require a relatively complex drive system. Since the closure element can also be formed integrally, it can be subjected to high acceleration forces so that this valve can also be used for quick and emergency closures. Closing and sealing can be done by a single linear movement, allowing very fast closing and opening of valve 1.

One particular advantage of monovalves, for example, is that the seal is not subject to any transverse load in the transverse direction to the longitudinal extension of the seal due to its course when it closes. On the other hand, due to its transverse extension to the opening axis H, the seal is hardly able to absorb the forces occurring on the closure element 4 along the opening axis H, which can act on the closure element 4 in particular at high differential pressure, which requires a robust construction of the closure element 4, its drive and its bearing.

The vacuum valve 1 shown in FIGS. 1a and 1b comprises two temperature sensors 10' and 10" according to the invention. At least one of the sensors 10', 10" is designed as a Pt100 element and is in direct contact with a respective valve component, i.e. with the drive unit 7 or the valve closure 4. The temperature sensor 10', 10" can, for example, be fixed to the drive unit 7 or the valve closure 4 by means of a screw connection or be glued thereto.

With the first temperature sensor 10' a current temperature of the valve closure can be determined. The second temperature sensor 10" allows the recording of a temperature of the drive unit.

At the drive unit 7, an increase in temperature can occur due to parts moving relative to each other and the friction that occurs as a result. A temperature measurement on the drive unit 7 thus makes it possible to determine the current operating status of the drive unit 7. This way, for example, overheating or generally critical operation of the drive unit 7 can be avoided. If a temperature threshold value or a tolerance range around the temperature threshold value is reached, the drive unit can be controlled or stopped accordingly for operation with a lower load. Alternatively, a cooling unit for drive 7 or valve 1 can be started or operated with a larger power stage.

In addition, the temperature measurement on the drive unit 7 can represent a valve state with regard to the precision of the adjustment path for the closure element 4. If the temperature is elevated, there may be play in the guide of the drive unit 7 or the valve stem 5, which may increase and make it necessary to adjust the control parameters accordingly to ensure that the valve continues to function reliably as desired. Such an adjustment of the control can be carried out automatically on the basis of current measurement signals of the sensor 10".

The second sensor 10' on the shutter 4 can be used to detect an effect of the temperature increase caused by the drive unit 7 and to make adjustments to the control system on the basis of such a measurement.

In addition, the sensor 10' can be used to determine a thermal effect caused by a vacuum machining process, which can be carried out on one side of opening 2 when valve 1 is used. If, for example, a machining process takes place at a high chamber temperature, this temperature can have a negative influence on the seal of valve 1 and lead to accelerated wear of the seal. By continuously measuring this temperature, the service life of the seal and thus the reliability of the vacuum seal can be determined as a function of the operating time. An optimized and timely replacement of the seal is thus made possible, i.e. a corresponding maintenance requirement can be pre-determined and planned. Downtimes can thus be significantly reduced and at least partially avoided.

FIGS. 2a-2c show another embodiment of a vacuum valve 1' according to the invention, which is designed as a transfer valve 1', shown in different closing positions.

The shown transfer valve 1' is a special form of a slide valve. The vacuum valve 1' has a rectangular, plate-shaped closure element 4 (valve disk), which has a sealing surface 6 for gas-tight closing of an opening 2. The opening 2 has a cross-section corresponding to the closure element 4 and is formed in a wall 12. Opening 2 is surrounded by a valve seat, which in turn also provides a sealing surface 3 corresponding to the sealing surface 6 of the closure element 4. The sealing surface 6 of the closure element 4 extends around the closure element 4 and has a sealing material (seal). In a closed position, the seal is pressed between the sealing surfaces 6, 3.

The opening 2 connects a first gas area L, which is located to the left of wall 12, to a second gas area R to the right of wall 12. Wall 12 is formed, for example, by a chamber wall of a vacuum chamber. The vacuum valve 1' is then formed by interaction of the chamber wall 12 with the closure element 4.

The closure element 4 is arranged on an adjustment arm 5, which here is rod-shaped, for example, and extends along a geometric adjustment axis V. The adjustment arm 5 is mechanically coupled to a drive unit 7, by means of which the closure element 4 can be adjusted in the first gas area L to the left of the wall 12 by adjusting the adjustment arm 5 between an open position O (FIG. 2a) via an intermediate position Z (FIG. 2b) into a closed position G (FIG. 2c) by means of the drive unit 7.

In the open position O, the closure element 4 is located outside the projection area of opening 2 and releases it completely, as shown in FIG. 2a.

By adjusting the adjustment arm 5 in axial direction parallel to the first "vertical" adjustment axis V and parallel to the wall 12, the closure element 4 can be adjusted from the open position O to the intermediate position Z by means of the drive unit 7.

In this intermediate position Z (FIG. 2b), the sealing surface 6 of the closure element 4 is located at a distance from the sealing surface 3 of the valve seat surrounding the opening 2.

By adjusting the adjustment arm 5 in the direction of the second, "horizontal" adjustment axis H (transverse to the first adjustment axis V), e.g. perpendicular to the wall 12 and to the valve seat, the closure element 4 can be adjusted from the intermediate position Z to the closed position G (FIG. 2c).

In the closed position G the closure element 4 closes the opening 2 in a gas-tight manner and separates the first gas area L from the second gas area R in a gas-tight manner.

The vacuum valve is thus opened and closed by means of the drive unit 7 by an L-shaped movement in two directions H, V of the closure element 4 and the adjustment arm 5, which directions, for example, are perpendicular to each other. For this reason, the transfer valve shown is also called an L-type valve.

A transfer valve 1' as shown is typically used for sealing a process volume (vacuum chamber) and for loading and unloading the volume. Frequent changes between the open position O and the closed position G are the rule for such an operation. This can lead to increased wear of the sealing surfaces 6 and 3 of the interposed seal and the mechanically moving components, e.g. the adjustment element 5 or other parts of the drive unit 7.

Among other things, the vacuum valve 1' has a temperature sensor 10 according to the invention for the early detection of such signs of wear. The temperature sensor 10 is arranged here on the adjustment element 5. Due to the large number of repetitive opening and closing processes, the adjustment element 5 can heat up during valve operation, e.g. due to friction effects. Heating the adjustment element 5 can in turn lead to reduced stiffness and thus increased bending capacity. As a result, a reduced contact pressure can occur between the two sealing surfaces 3 and 6 and thus reduce or even eliminate the desired sealing effect.

Such a change in the valve function can be detected and compensated for by recording the temperature on the adjustment element 5 itself. For example, a threshold value for a temperature of the adjustment element 5 is known at which the elasticity of the adjustment element 5 is too high and then no reliable sealing can be provided during normal operation. The temperature sensor 10 thus allows the determination of whether the temperature is below or above the threshold value and thus whether the integrity of a sealing process is maintained or not.

If the threshold value is exceeded, an actuation of the drive unit 7 can be adapted. For example, an adjustment travel for reaching the closed position in the direction of the adjustment axis H can be increased, so that a desired compression of the seal is achieved by a correspondingly increased deflection of the adjustment element 5 and the sealing of a vacuum volume remains guaranteed.

The actuation can be adjusted fully automatically by means of a processing and control unit (not shown). For this purpose, measurement signals from the temperature sensor 10 can be transmitted to the processing and control unit by radio or cable. The control signals can also be transmitted from the processing and control unit to the drive unit 7. The processing and control unit can be located directly on the valve 1' or can be designed as a structurally separated unit (e.g. laptop with corresponding interface and algorithm) and in communication connection.

The control can be continuously adapted, for example if the bending behavior of the adjustment element 5 is known as a function of its temperature. In this way, a constant contact pressure can be provided at varying temperatures.

Figure 3B:
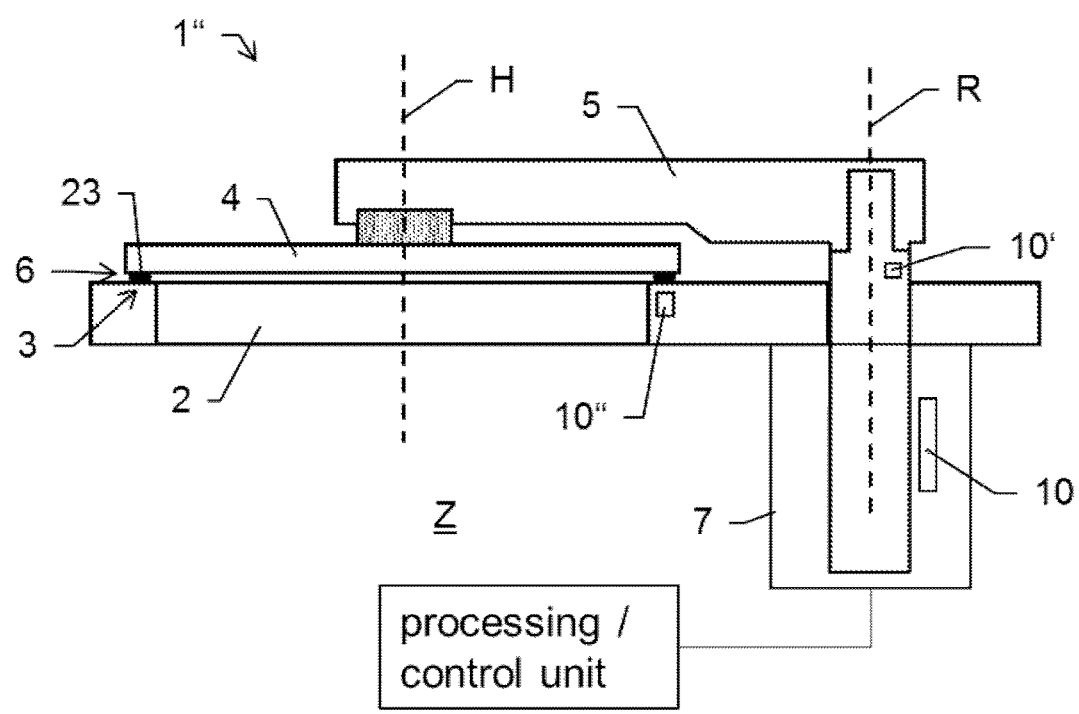

FIG. 3a and FIG. 3b schematically show another possible embodiment of the valve according to the invention in the form of a pendulum valve 1". The valve 1 at least for regulating a mass flow has a valve housing with an opening 2. The opening 2 here, for example, has a circular cross-section. Opening 2 is enclosed by a valve seat. This valve seat is formed by a (first) sealing surface 3, which is formed in the valve housing and has the shape of a circular ring, points axially in the direction of a valve disk 4, extends transversely to the opening axis H. The valve disk 4 is pivotable about a rotation axis R and is essentially adjustable parallel to the opening axis H. In a closed position (FIG. 3b) of the valve disk 4 (valve closure), the opening 2 is closed in a gas-tight manner by means of the valve disk 4, which has a second sealing surface 6 with sealing material. An open position of the valve disk 4 is illustrated in FIG. 3a.

The valve disk 4 is connected to a drive unit 7 via an adjustment element 5 (arm) arranged on the side of the disk and extending perpendicularly to the opening axis H. In the closed position of the valve disk 4, this arm 5 is located outside the opening cross-section of opening 2 geometrically projected along the opening axis H.

The drive 7 is designed by using a motor and a corresponding gear in such a way that the valve disk 4—as is usual with a pendulum valve—can be pivoted by means of a transverse movement x of the drive 7 transversely to the opening axis H and essentially parallel over the cross-section of the opening 2 and perpendicular to the opening axis H in the form of a pivoting movement about the pivoting axis R between an open position and an intermediate position and can be displaced linearly by means of a longitudinal movement of the drive 7 parallel to the opening axis H. In the open position, the valve disk 4 is positioned in a dwelling section arranged laterally next to the opening 2 so that the opening 2 and the flow path are released. In the intermediate position, the valve disk 4 is positioned at a distance above opening 2 and covers the opening cross-section of opening 2. In the closed position, opening 2 is closed in a gas-tight manner and the flow path is interrupted by a gas-tight contact between the sealing surface 6 of the valve closure 4 (valve disk) and the sealing surface 3 of the valve seat.

In order to enable automated and controlled opening and closing of valve 1, the valve 1" provides, for example, an electronic regulating and control unit (not shown) which is designed and connected to the drive 7 in such a way that the valve disk 4 can be adjusted accordingly for closing a process volume or for regulating an internal pressure of this volume.

In the present embodiment example, the drive 7 is designed as an electric motor, wherein the gear can be switched in such a way that driving the drive 7 causes either the transverse movement x or the longitudinal movement. The drive and gear are electronically actuated by the regulating system. Such gears, in particular with splitter gearshifts, are known from the state of the art. Furthermore, it is possible to use several drives to effect the rotary motion and the linear motion, wherein the control assumes the actuation of the drives.

The precise regulation and adjustment of the flow rate with the described pendulum valve 1" is not only possible by the pivoting adjustment of the valve disk 4 between the open position and the intermediate position by means of the transverse movement, but above all by the linear adjustment of the valve disk 4 along the opening axis H or R between the intermediate position and the closed position by means of the longitudinal movement. The pendulum valve described can be used for precise regulating tasks.

Both the valve disk 4 and the valve seat each have a sealing surface—a first and a second sealing surface 3 and 6. The second sealing surface 6 of the valve disk 4 also has the seal 23. This seal 23 can, for example, be vulcanized as a polymer onto the valve disk 4 by means of vulcanization. Alternatively, the seal 23 can be designed, for example, as an O-ring in a groove of the valve seat. A sealing material can also be bonded to the valve disk 4 or the valve seat, thus embodying the seal 23. In an alternative embodiment, the seal 23 can be located on the valve seat side, especially on the first sealing surface 3. Combinations of these embodiments are also conceivable. Such seals 23 are of course not limited to the valve 1" described in the example, but can also be used with the other described valve embodiments.

The valve disk 4, for example, is variably adjusted on the basis of regulating variables and an output control signal. As an input signal, for example, information about a current pressure state in a process volume connected to valve 1" is received. In addition, the controller can be provided with a further input variable, e.g. a mass flow into the volume. On the basis of these variables and on the basis of a specified target pressure, which is to be set or reached for the volume, a regulated setting of valve 1" is then carried out over the time of a regulating cycle, so that a mass outflow from the volume can be regulated over time by means of valve 1". A vacuum pump is provided behind valve 1", i.e. valve 1" is arranged between the process chamber and the pump. Thus a desired pressure curve can be adjusted.

By setting the valve closure 4, a respective opening cross-section is set for valve opening 2 and thus the possible gas quantity that can be evacuated from the process volume per time unit is set. For this purpose, the valve closure 4 may have a shape deviating from a circular shape, especially in order to achieve as laminar a media flow as possible.

To set the opening cross-section, the valve disk 4 can be adjusted from the open position to the intermediate position by the regulating and control unit by means of the transverse movement of the drive 7 and from the intermediate position to the closed position by means of the longitudinal movement of the drive 7. To completely open the flow path, the valve disk 4 can be adjusted by the controller by means of the longitudinal movement of the drive 7 from the closed position to the intermediate position and from there by means of the rotary movement of the drive 7 from the intermediate position to the open position.

The valve disk 4 must be pressed against the valve seat in such a way that both the required gas tightness within the entire pressure range is ensured and damage to the valve 1", or more precisely to the sealing surfaces 3 and 6 or to the seal(s) 23, due to excessive pressure is avoided. In order to ensure this, well-known valves provide for contact pressure regulation of valve disk 4 as a function of the pressure difference between the two sides of the valve disk.

According to the invention, the valve 1" has four temperature sensors 10, 10', 10" and 10‴. Each sensor is arranged on the valve in such a way that a component-specific temperature can be measured.

The first sensor 10 is provided on the drive unit 7 and is therefore able to record information on the drive status. Possible heat development of the drive 7 can thus be detected.

A second temperature sensor 10' is placed on a movable part of the valve 1", a valve rod for connecting the adjustment arm 5 to the drive unit 7. Thermal influences due to friction effects, for example, can be detected and a structural deviation of the rod assembly can be displayed.

A third sensor 10" is located on the valve seat near the first sealing surface 3. This can be used to detect an increase in the temperature of sealing surface 3 or sealing material 23. Such an increase in temperature can occur, for example, due to a large number of closing processes or can be an indicator of friction on the seal. The information thus allows, on the one hand, logging of the seal condition or ageing of the seal due to temperature fluctuations for improved maintenance planning and shorter downtimes. Secondly, unwanted friction can be detected, which can be an indicator of critical valve operation. Such friction, in particular on the sealing material 23, can produce particles, which can cause contamination of the vacuum and thus have a negative effect on a machining process.

With the fourth sensor, 10''', which is arranged on the valve housing, external thermal influences, for example, can be detected. These include, for example, an intended high processing temperature in the vacuum volume, which can also determine the service life of the seal, or increased ambient temperatures, which can have an effect on the precision of a closing movement.

Each sensor thus provides information, the dissemination of which can be used to set specific compensation for valve operation or to generate a corresponding output signal, e.g. an alarm. Typically, this is done by comparing the measured temperatures with assigned target states (e.g. target temperatures or target temperature curve).

It is understood that the four sensors 10-10''' are shown here as mere examples in combination. The invention also encompasses those embodiments that only have one of these sensors described.

As an alternative to a pendulum valve 1'' as shown, the vacuum valve 1 according to the invention can be realized with another type of vacuum valve, e.g. a flap valve, slide valve or a so-called butterfly control valve. In addition, pendulum valves can also be used, the closure of which can only be adjusted in one direction.

Figure 4B:
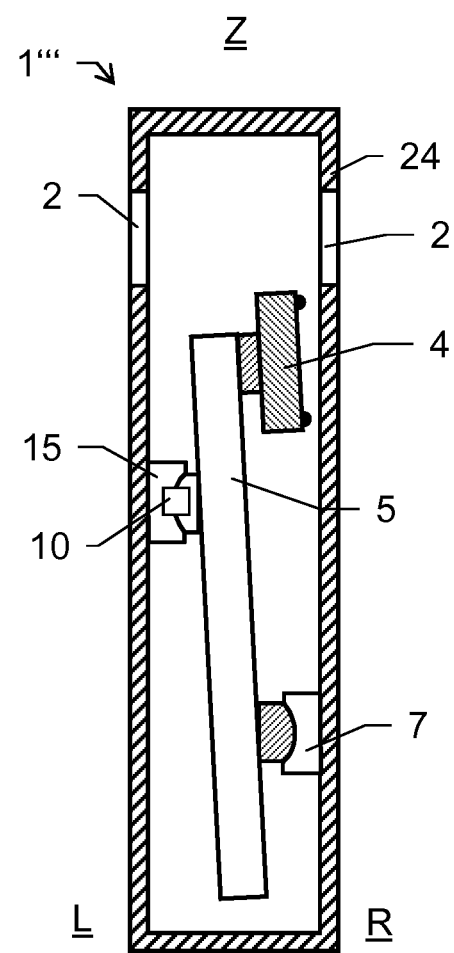

FIGS. 4a and 4b schematically show another possible temperature sensor arrangement 10 in transfer valves according to the invention, shown in a closed position (FIG. 4a) and an open position (FIG. 4b). In the figures shown, the valve seat is formed on a housing 24 of the vacuum valve 1'''. For a person skilled in the art, however, it is clear that the following description can essentially be applied analogously to embodiments, wherein the valve seat is provided by a process chamber, i.e. a chamber housing.

Furthermore, it goes without saying that the valve mechanism shown here schematically as tilting mechanism is not to be understood as restrictive and that a person skilled in the art can transfer the inventive sensor arrangement, for example, in an analogous way to any L-Motion drive, e.g. an L-Motion drive with two linear adjustment directions of the valve disk perpendicular to each other.

For the controlled guidance of the adjustment arm 5, the vacuum valve 1 here, for example, has a guide component 15, wherein the drive unit 7 and the guide component 15 are each in a fixed arrangement to each other, in this case, for example, because both the drive unit 7 and the guide component 15 are each fixedly connected to the valve housing 24. The adjustment arm 5 is further mechanically coupled to the valve closure 4 and the drive unit 7, wherein by adjusting the adjustment arm 5 by means of the drive unit 7, the valve closure 4 is adjustable between the open position and the closed position substantially parallel to the valve seat, in particular in an L-motion movement as described in FIGS. 2a to 2c.

According to the invention, the guide component has a temperature sensor 10. The temperature sensor 10 makes it possible to detect a thermal change at the guide component 15, in particular caused by friction occurring at the guide component 15.

It is understood that these figures only schematically represent possible embodiment examples. The different approaches can also be combined with each other as well as with devices and methods according to the prior art.

The invention claimed is:

1. A vacuum valve comprising:
   a vacuum slide valve, pendulum valve or monovalve, for regulating a volume or mass flow and/or for gas-tight interruption of a flow path, having
   a valve seat which has a valve opening defining an opening axis (H) and a first sealing surface surrounding the valve opening,
   a valve closure for regulating the volume or mass flow and/or for interrupting the flow path, having a second sealing surface corresponding to the first sealing surface,
   a drive unit which is coupled to the valve closure and which is designed such that the valve closure is adjustable from an open position (O), in which the valve closure and the valve seat are present without contact relative to one another, into a closed position (G), in which a sealing contact exists between the first sealing surface and the second sealing surface via an interposed seal and the valve opening is thereby closed in a gas-tight manner, and back again,
   wherein the vacuum valve has at least one temperature sensor, wherein the at least one temperature sensor is designed and arranged in such a way that, by means of the at least one temperature sensor, a measurement signal representing thermal information with reference to at least part of the vacuum valve is detected, and
   wherein the drive is controlled by a processing and control unit of the vacuum valve, the drive unit being actuated with control values for adjusting the valve closure between the open position (O) and the closed position (G), and the processing and control unit automatically sets the control values depending on the detected measurement signal.

2. The vacuum valve according to claim 1, wherein the at least one temperature sensor is arranged on the drive unit.

3. The vacuum valve according to claim 1, wherein the drive unit is designed as a pneumatic drive and the at least one temperature sensor is arranged on a pneumatic cylinder of the drive unit.

4. The vacuum valve according to claim 1, wherein the at least one temperature sensor is arranged on the valve closure or the valve seat.

5. The vacuum valve according to claim 1, wherein the vacuum valve has a valve housing and the at least one temperature sensor is arranged on the valve housing.

6. The vacuum valve according to claim 1, wherein the at least one temperature sensor is formed as one of the following temperature sensors:
   a thermistor,
   a PTC thermistor,
   a platinum or silicon measuring resistor,
   a Pt 100 element,
   a semiconductor temperature sensor,
   an integrated semiconductor temperature sensor,
   an optical temperature sensor,
   an infrared thermometer, and
   a thermocouple.

7. The vacuum valve according to claim 1, wherein the thermal information is represented by a temperature.

8. The vacuum valve according to claim 1, wherein the measurement signal is continuously detectable.

9. A vacuum valve comprising:
a vacuum slide valve, pendulum valve or monovalve, for regulating a volume or mass flow and/or for gas-tight interruption of a flow path, having
a valve seat which has a valve opening defining an opening axis (H) and a first sealing surface surrounding the valve opening,
a valve closure for regulating the volume or mass flow and/or for interrupting the flow path, having a second sealing surface corresponding to the first sealing surface,
a drive unit which is coupled to the valve closure and which is designed such that the valve closure is adjustable from an open position (O), in which the valve closure and the valve seat are present without contact relative to one another, into a closed position (G), in which a sealing contact exists between the first sealing surface and the second sealing surface via an interposed seal and the valve opening is thereby closed in a gas-tight manner, and back again,
wherein the vacuum valve has at least one temperature sensor, wherein the at least one temperature sensor is designed and arranged in such a way that, by means of the at least one temperature sensor, a measurement signal representing thermal information with reference to at least part of the vacuum valve is detected,
wherein controlled by a processing and control unit of the vacuum valve, the drive unit can be actuated with control values for adjusting the valve closure between the open position (O) and the closed position (G), and the processing and control unit is configured such that the control values are automatically set depending on the detected measurement signal, and
wherein the processing and control unit is designed in such a way that the detected measurement signal can be processed by means of the processing and control unit and status information is generated on the basis of the detected measurement signal.

10. The vacuum valve according to claim 9, wherein an output signal is provided based on an alignment of the status information with a predefined tolerance value.

11. The vacuum valve according to claim 9, wherein the status information relating to a mechanical and/or structural integrity of the drive unit, the valve seat and/or the valve closure is provided, wherein the status information is generated by means of an actual/target comparison for the detected measurement signal.

12. A method for monitoring a vacuum valve, wherein the vacuum valve is designed to regulate a volume or mass flow and/or to interrupt a flow path in a gas-tight manner, and the vacuum valve comprises
a valve seat having a valve opening defining an opening axis (H) and a first sealing surface surrounding the valve opening,
a valve closure for regulating the volume or mass flow and/or for interrupting the flow path, having a second sealing surface which corresponds to the first sealing surface and whose variable position is determined by a respective position and orientation of the valve closure,
a drive unit coupled to the valve closure and having at least one movable adjustment element, wherein the drive unit is designed to carry out an adjusting movement so that the valve closure is adjustable from an open position (O) in which the valve closure and the valve seat are contactless relative to one another, into a closed position (G) in which a sealing contact exists between the first sealing surface and the second sealing surface and the valve opening is thereby closed in a gas-tight manner, and back again,
wherein thermal information relating to at least part of the vacuum valve is detected, and
wherein the thermal information is acquired periodically during a specific period of time, and a temperature-time curve is derived.

13. The method according to claim 12, wherein an output information relating to a valve state is generated on the basis of the temperature-time curve, wherein the output information specifies a reference of a current temperature to a temperature threshold value, an effect of the temperature-time curve on an operating state of the valve, a valve service life and/or an expected valve maintenance time.

14. A non-transitory computer program product comprising program code, the computer program product being stored on a machine-readable carrier, and executed by a control and processing unit of a vacuum valve for carrying out the acquisition of the thermal information according to claim 12.

* * * * *